United States Patent
Shatunov et al.

(10) Patent No.: US 11,139,502 B2
(45) Date of Patent: Oct. 5, 2021

(54) ELECTROLYTE FOR RECHARGEABLE LITHIUM BATTERY AND RECHARGEABLE LITHIUM BATTERY

(71) Applicant: SAMSUNG SDI CO., LTD., Yongin-si (KR)

(72) Inventors: Pavel Shatunov, Yongin-si (KR); Myungheui Woo, Yongin-si (KR); Harim Lee, Yongin-si (KR); Jin-Hyeok Lim, Yongin-si (KR); Hyunbong Choi, Yongin-si (KR); Olga Tsay, Yongin-si (KR); Hyejin Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 159 days.

(21) Appl. No.: 16/419,175

(22) Filed: May 22, 2019

(65) Prior Publication Data

US 2019/0363397 A1 Nov. 28, 2019

(30) Foreign Application Priority Data

May 23, 2018 (KR) .................. 10-2018-0058397

(51) Int. Cl.
*H01M 10/0525* (2010.01)
*H01M 10/0567* (2010.01)
*H01M 10/0569* (2010.01)

(52) U.S. Cl.
CPC ... *H01M 10/0525* (2013.01); *H01M 10/0567* (2013.01); *H01M 10/0569* (2013.01)

(58) Field of Classification Search
CPC ......... H01M 10/0525; H01M 10/0567; H01M 10/0569; H01M 10/052; Y02E 60/10
See application file for complete search history.

(56) References Cited

U.S. PATENT DOCUMENTS

2006/0269843 A1* 11/2006 Usami ............... H01M 10/0567
429/324
2012/0034532 A1 2/2012 Kim et al.
(Continued)

FOREIGN PATENT DOCUMENTS

JP 2009004352 * 1/2009
KR 10-2008-0046880 A 5/2008
(Continued)

OTHER PUBLICATIONS

JP2009004352 MT (Year: 2009).*

*Primary Examiner* — Alexander Usyatinsky
(74) *Attorney, Agent, or Firm* — Lee IP Law, P.C.

(57) ABSTRACT

An electrolyte for a rechargeable lithium battery and a rechargeable lithium battery including the electrolyte, the electrolyte including a non-aqueous organic solvent; a lithium salt; and an additive, wherein the additive includes a compound represented by Chemical Formula 1:

[Chemical Formula 1]

$$R^1-\underset{O}{\overset{O}{\underset{\|}{S}}}-O-\underset{R^4}{\overset{R^3}{\underset{|}{Si}}}-\left(CH_2\right)_n-\underset{R^6}{\overset{R^5}{\underset{|}{Si}}}-O-\underset{O}{\overset{O}{\underset{\|}{S}}}-R^2$$

wherein, in Chemical Formula 1, $R^1$ to $R^6$ are each independently hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted (Continued)

C3 to C10 cycloalkyl group, or a substituted or unsubstituted C3 to C10 cycloalkenyl group, and n is an integer of 1 to 10.

18 Claims, 3 Drawing Sheets

(56) References Cited

U.S. PATENT DOCUMENTS

2013/0071733 A1* 3/2013 Abe .................. H01M 10/0567
    429/200
2016/0351963 A1* 12/2016 Shatunov .......... H01M 10/0525

FOREIGN PATENT DOCUMENTS

| | | |
|---|---|---|
| KR | 10-2008-0097599 A | 11/2008 |
| KR | 10-2010-0056672 A | 5/2010 |
| KR | 10-2013-0119842 A | 11/2013 |

* cited by examiner

ELECTROLYTE FOR RECHARGEABLE LITHIUM BATTERY AND RECHARGEABLE LITHIUM BATTERY

CROSS-REFERENCE TO RELATED APPLICATION

Korean Patent Application No. 10-2018-0058397, filed on May 23, 2018, in the Korean Intellectual Property Office, and entitled: "Electrolyte for Rechargeable Lithium Battery and Rechargeable Lithium Battery," is incorporated by reference herein in its entirety.

BACKGROUND

1. Field

Embodiments relate to an electrolyte for a rechargeable lithium battery and a rechargeable lithium battery including the same.

2. Description of the Related Art

A rechargeable lithium battery may be recharged and may have three or more times the high energy density per unit weight as a conventional lead storage battery, nickel-cadmium battery, nickel-metal hydride battery, nickel zinc battery, or the like. It may be also charged at a high rate and thus, may be commercially manufactured for a laptop, a cell phone, an electric tool, an electric bike, or the like, and research on improvement of additional energy density has been actively made.

A rechargeable lithium battery may be manufactured by injecting an electrolyte into a battery cell, which includes a positive electrode including a positive active material capable of intercalating/deintercalating lithium ions and a negative electrode including a negative active material capable of intercalating/deintercalating lithium ions.

SUMMARY

The embodiments may be realized by providing an electrolyte for a rechargeable lithium battery, the electrolyte including a non-aqueous organic solvent; a lithium salt; and an additive, wherein the additive includes a compound represented by Chemical Formula 1:

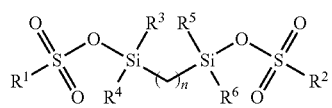

[Chemical Formula 1]

wherein, in Chemical Formula 1, $R^1$ to $R^6$ are each independently hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and n is an integer of 1 to 10.

The compound represented by Chemical Formula 1 may be represented by Chemical Formula 1A:

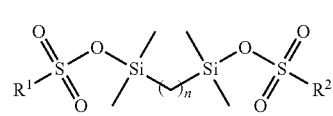

[Chemical Formula 1A]

wherein, in Chemical Formula 1A, $R^1$ and $R^2$ may each independently be hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and n may be an integer of 1 to 10.

$R^1$ and $R^2$ may each independently be a substituted or unsubstituted C1 to C4 alkyl group or a substituted or unsubstituted C2 to C4 alkenyl group.

$R^1$ and $R^2$ may each independently be an unsubstituted C1 to C4 alkyl group, a C1 to C4 alkyl group that is substituted or with a halogen or a cyano group, an unsubstituted C2 to C4 alkenyl group, or a C2 to C4 alkenyl group that is substituted with a halogen or a cyano group.

$R^1$ and $R^2$ may each independently be a methyl group, an ethyl group, or a vinyl group, and $R^3$ to $R^6$ may each independently be a substituted or unsubstituted C1 to C5 alkyl group.

The compound represented by Chemical Formula 1 may be included in the electrolyte in an amount of 0.05 wt % to 2 wt %, based on a total weight of the electrolyte for a rechargeable lithium battery.

The compound represented by Chemical Formula 1 may be included in the electrolyte in an amount of 0.2 wt % to 1 wt %, based on a total weight of the electrolyte for a rechargeable lithium battery.

The additive may be the compound represented by Chemical Formula 1.

The embodiments may be realized by providing a rechargeable lithium battery including a positive electrode; a negative electrode; and an electrolyte according to an embodiment.

The compound represented by Chemical Formula 1 may be represented by Chemical Formula 1A:

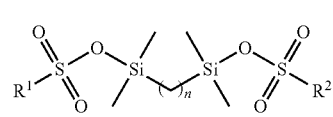

[Chemical Formula 1A]

wherein, in Chemical Formula 1A, $R^1$ and $R^2$ may each independently be hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and n may be an integer of 1 to 10.

$R^1$ and $R^2$ may each independently be a substituted or unsubstituted C1 to C4 alkyl group or a substituted or unsubstituted C2 to C4 alkenyl group.

$R^1$ and $R^2$ may each independently be an unsubstituted C1 to C4 alkyl group, a C1 to C4 alkyl group that is substituted or with a halogen or a cyano group, an unsubstituted C2 to C4 alkenyl group, or a C2 to C4 alkenyl group that is substituted with a halogen or a cyano group.

$R^1$ and $R^2$ may each independently be a methyl group, an ethyl group, or a vinyl group, and $R^3$ to $R^6$ may each independently be a substituted or unsubstituted C1 to C5 alkyl group.

The compound represented by Chemical Formula 1 may be included in the electrolyte in an amount of 0.05 wt % to 2 wt %, based on a total weight of the electrolyte for a rechargeable lithium battery.

The compound represented by Chemical Formula 1 may be included in the electrolyte in an amount of 0.2 wt % to 1 wt %, based on a total weight of the electrolyte for a rechargeable lithium battery.

The additive may be the compound represented by Chemical Formula 1.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
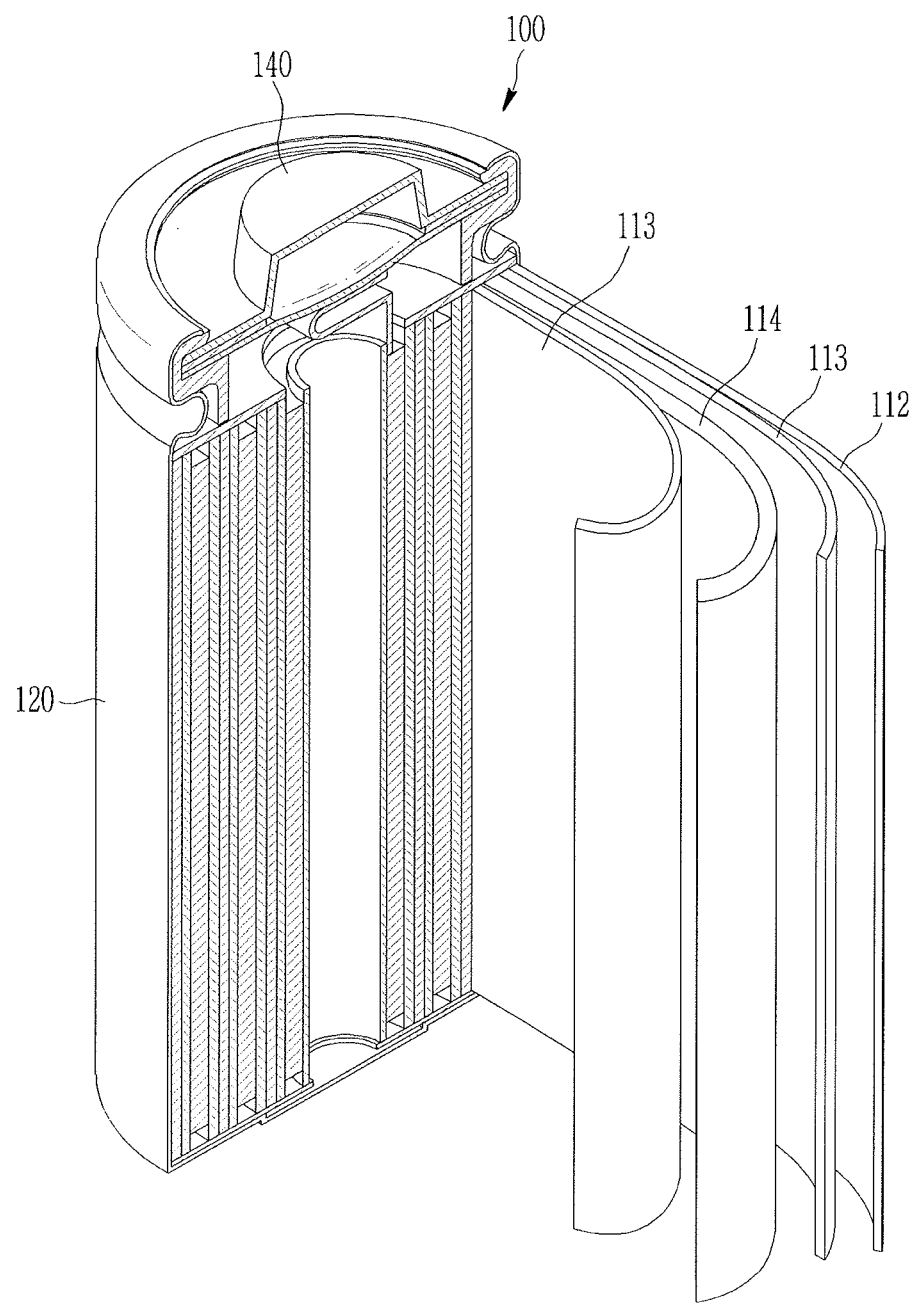
FIG. 1 illustrates a schematic view showing a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, when a definition is not otherwise provided, 'substituted' refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl acid group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an electrolyte for a rechargeable lithium battery according to an embodiment is described.

An electrolyte for a rechargeable lithium battery according to an embodiment may include a non-aqueous organic solvent, a lithium salt, and an additive. In an implementation, the additive may include a compound represented by Chemical Formula 1.

[Chemical Formula 1]

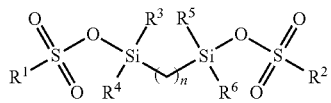

In Chemical Formula 1, $R^1$ to $R^6$ may each independently be or include, e.g., hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group. As used herein, e.g., the term cycloalkyl is used to separately describe a cyclic alkyl, relative to the generic term alkyl (e.g., acyclic alkyl).

n may be, e.g., an integer of 1 to 10.

The compound represented by Chemical Formula 1 may be a neutral compound having no charge and may have excellent solubility with respect to a solvent and its amount is easy to adjust.

In an implementation, the compound represented by Chemical Formula 1 may form an ion-conductive solid CEI (cathode-electrolyte interface) film that is rich in chemical species having a polar —$SO_3$— group by performing an anodic oxidation reaction or an interaction with $LiPF_6$ during charging.

Also, in the electrolyte, the —Si—O— group of the compound represented by Chemical Formula 1 may react with an $F^-$ containing chemical species (e.g., HF) to capture $F^-$ and to form a compound having a strong bond of Si—F. For example, the positive electrode may be prevented from being dissolved or decomposed by HF. Undesirable side reactions between the electrode and the electrolyte may be suppressed, thereby reducing an amount of gas generated in a battery and reducing an increase rate in resistance in a rechargeable lithium battery.

The compound represented by Chemical Formula 1 may include two —$SO_2$—O—Si— groups in one molecule, and it may maximize the aforementioned effect in the same molar concentration relative to a compound including only one —$SO_2$—O—Si— group in one molecule.

In an implementation, the compound represented by Chemical Formula 1 may be represented by Chemical Formula 1A.

[Chemical Formula 1A]

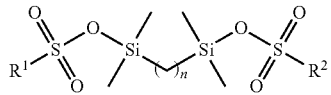

In Chemical Formula 1A, $R^1$, $R^2$, and n may be the same as described above.

In an implementation, $R^1$ and $R^2$ may each independently be or include, e.g., a substituted or unsubstituted C1 to C4 alkyl group or a substituted or unsubstituted C2 to C4 alkenyl group.

In an implementation, $R^1$ and $R^2$ may each independently be or include. e.g., an unsubstituted C1 to C4 alkyl group, a C1 to C4 alkyl group that is substituted with a halogen or a cyano group, an unsubstituted C2 to C4 alkenyl group, or a C2 to C4 alkenyl group that is substituted with a halogen or a cyano group.

In an implementation, $R^1$ and $R^2$ may each independently be, e.g., a methyl group, an ethyl group, or a vinyl group and $R^3$ to $R^6$ may each independently be, e.g., a substituted or unsubstituted C1 to C5 alkyl group.

In an implementation, the compound represented by Chemical Formula 1 may be included in the electrolyte in an amount of, e.g., about 0.05 wt % to about 2 wt %, about 0.15 wt % to about 1.5 wt %, or about 0.2 wt % to about 1 wt %, based on a total weight of the electrolyte for a rechargeable lithium battery.

When the amount of the compound represented by Chemical Formula 1 is in the above ranges, a resistance increase and gas generation at a high temperature storage may be suppressed and thereby, a rechargeable lithium battery having improved charge-discharge characteristics may be realized.

Maintaining the amount of the compound represented by Chemical Formula 1 at about 0.05 wt % or greater may help prevent a deterioration in storage characteristics at a high temperature. Maintaining the amount of the compound represented by Chemical Formula 1 at about 2 wt % or less may help prevent a deterioration in cycle-life caused by an interface resistance increase.

In an implementation, the additive according to an embodiment may include the compound represented by Chemical Formula 1 alone or may further include other additives along with the compound represented by Chemical Formula 1.

The non-aqueous organic solvent may serve as a medium for transmitting ions taking part in the electrochemical reaction of a battery.

The non-aqueous organic solvent may be, e.g., a carbonate solvent, ester solvent, ether solvent, ketone solvent, alcohol solvent, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include methyl acetate, ethyl acetate, n-propyl acetate, dimethylacetate, methylpropionate, ethylpropionate, propylpropionate, decanolide, mevalonolactone, caprolactone, or the like. The ether solvent may include dibutyl ether, tetraglyme, diglyme, dimethoxyethane, 2-methyltetrahydrofuran, tetrahydrofuran, or the like. The ketone solvent may include cyclohexanone, or the like. The alcohol solvent may include ethanol, isopropyl alcohol, or the like. The aprotic solvent may include nitriles such as R—CN (wherein R is a hydrocarbon group having a C2 to C20 linear, branched, or cyclic structure and may include a double bond, an aromatic ring, or an ether bond), or the like, dioxolanes such as 1,3-dioxolane, or the like, sulfolanes, or the like.

The non-aqueous organic solvent may be used alone or in a mixture. When the organic solvent is used in a mixture, a mixture ratio may be controlled in accordance with a desirable battery performance.

The carbonate solvent may be prepared by mixing a cyclic carbonate and a linear carbonate. When the cyclic carbonate and linear carbonate are mixed together in a volume ratio of about 1:1 to about 1:9, an electrolyte performance may be improved.

The non-aqueous organic solvent may further include an aromatic hydrocarbon organic solvent in addition to the carbonate solvent. In an implementation, the carbonate solvent and the aromatic hydrocarbon organic solvent may be mixed in a volume ratio of about 1:1 to about 30:1.

The aromatic hydrocarbon organic solvent may be an aromatic hydrocarbon-based compound of Chemical Formula 2.

[Chemical Formula 2]

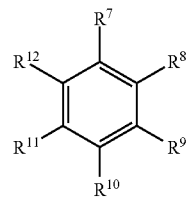

In Chemical Formula 2, $R^7$ to $R^{12}$ may each independently be, e.g., hydrogen, a halogen, a C1 to C10 alkyl group, a haloalkyl group, and a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate compound represented by Chemical Formula 3 in order to improve cycle-life of a battery.

[Chemical Formula 3]

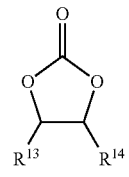

In Chemical Formula 3, $R^{13}$ and $R^{14}$ may each independently be, e.g., hydrogen, a halogen, a cyano group (CN), a nitro group ($NO_2$), and a fluorinated C1 to C5 alkyl group. In an implementation, at least one of $R^{13}$ and $R^{14}$ is a halogen, a cyano group (CN), a nitro group ($NO_2$), and a fluorinated C1 to C5 alkyl group and $R^{13}$ and $R^{14}$ are not simultaneously hydrogen.

Examples of the ethylene carbonate compound may include difluoroethylene carbonate, chloroethylene carbonate, dichloroethylene carbonate, bromoethylene carbonate, dibromoethylene carbonate, nitroethylene carbonate, cyano-ethylene carbonate, or fluoroethylene carbonate. The amount of the additive for improving cycle-life may be used within an appropriate range.

The lithium salt dissolved in the non-organic solvent supplies lithium ions in a battery, enables a basic operation of a rechargeable lithium battery, and improves transportation of the lithium ions between positive and negative electrodes. Examples of the lithium salt may include $LiPF_6$, $LiBF_4$, $LiSbF_6$, $LiAsF_6$, $LiN(SO_2C2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer ranging from 1 to 20), LiCl, LiI and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

Another embodiment provides a rechargeable lithium battery including a positive electrode; a negative electrode; and the electrolyte.

The positive electrode may include a current collector and a positive active material layer on the current collector and including a positive active material.

The positive active material may include lithiated intercalation compounds that reversibly intercalate and deintercalate lithium ions.

In an implementation, at least one composite oxide of lithium and a metal of cobalt, manganese, nickel, or a combination thereof may be used.

Examples of the positive active material may be a compound represented by one of chemical formulae.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, ≤c≤0.5, 0≤α≤2); $Li_aNi_{1-b-c}Co_bX_cO_{2-\alpha}T_\alpha$ (0.90≤a≤1.8, 0≤b≤0.5, ≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α<2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤23 0.5, 0≤c≤0.05, 0<α<2); $Li_aNi_bE_cGdO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0<b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8)

In the above chemical formulae, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method (e.g., spray coating, dipping, etc.).

Examples of the positive active material according to an embodiment may include $Li_xNi_yCo_zAl_{1-y-z}O_2$ (1≤x≤1.2, 0.5≤y≤1, and 0≤z≤0.5).

The positive active material may be included in an amount of about 90 wt % to about 98 wt % based on a total weight of the positive active material layer.

In an implementation, the positive active material layer may include a binder and a conductive material. In an implementation, the binder and the conductive material may be included in an amount of about 1 wt % to about 5 wt %, respectively based on a total amount of the positive active material layer.

The binder may help improve binding properties of positive active material particles with one another and with a current collector. Examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to provide electrode conductivity. A suitable electrically conductive material that does not cause a chemical change may be used. Examples of the conductive material may include a carbon material such as natural graphite, artificial graphite, carbon black, acetylene black, ketjen black, a carbon fiber, or the like; a metal material of a metal powder or a metal fiber including copper, nickel, aluminum, silver, or the like; a conductive polymer such as a polyphenylene derivative; or a mixture thereof.

The current collector may include Al.

The negative electrode includes a current collector and a negative active material layer formed on the current collector and including a negative active material.

The negative active material may include a material that reversibly intercalates/deintercalates lithium ions, a lithium metal, a lithium metal alloy, a material being capable of doping/dedoping lithium, or transition metal oxide.

The material that reversibly intercalates/deintercalates lithium ions may include a carbon material. The carbon material may be a suitable carbon negative active material in a rechargeable lithium ion battery. Examples thereof may be crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may be Si, a Si—C composite, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), or the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of about 95 wt % to about 99 wt % based on a total weight of the negative active material layer.

In an implementation, the negative active material layer may include a binder, and optionally a conductive material. In the negative active material layer, a content of the binder may be about 1 wt % to about 5 wt % based on a total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder may help improve binding properties of negative active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber binder or a polymer resin binder. The rubber binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, ethylenepropylenecopolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as a negative electrode binder, a cellulose compound may be further used to provide viscosity as a thickener. The cellulose compound may include one or more of carboxymethyl cellulose, hydroxypropylmethyl cellulose, methyl cellulose, or alkali metal salts thereof. The alkali metals may be Na, K, or Li. Such a thickener may be included in an amount of about 0.1 to about 3 parts by weight based on 100 parts by weight of the negative active material.

The conductive material may be included to provide electrode conductivity. A suitable electrically conductive material that does not cause a chemical change may be used. Examples of the conductive material may include a carbon material such as natural graphite, artificial graphite, carbon black, acetylene black, ketjen black, a carbon fiber, or the like; a metal material of a metal powder or a metal fiber including copper, nickel, aluminum, silver, or the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The rechargeable lithium battery may further include a separator between the negative electrode and the positive electrode, depending on a type of the rechargeable lithium battery. Examples of a suitable separator material may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Referring to FIG. 1, a rechargeable lithium battery 100 according to an embodiment may include a battery cell including a negative electrode 112, a positive electrode 114 facing the negative electrode 112, a separator 113 interposed between the negative electrode 112 and the positive electrode 114, and an electrolyte (not shown) for a rechargeable lithium battery impregnating the negative electrode 112, the positive electrode 114, and the separator 113, a battery case 120 housing the battery cell, and a sealing member 140 sealing the battery case 120.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to, the particular details described in the Examples and Comparative Examples.

Manufacture of Rechargeable Lithium Battery Cell

Preparation Example 1: Synthesis of Compound 1-1

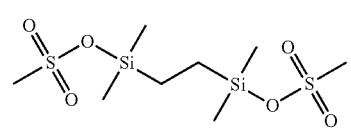

[Compound 1-1]

A mixture of 1,2-bis(chlorodimethylsilyl)ethane (21.53 g, 0.1 mol) and methanesulfonic acid (19.22 g, 0.2 mol) was heated up to 65° C. for 30 minutes, and the temperature was maintained for about 1 hour until a reaction of the mixture with HCl was completed. Subsequently, the reaction mixture was heated up to 120° C. and maintained at the same temperature for 24 hours. The reactant was cooled down to ambient temperature and distilled under vacuum by using a Vigreux column. Herein, a distillation condenser was kept warm in order to prevent the column from being clogged due to recrystallization of a product. The resultant was treated through fractional distillation under a condition of 162 to 164° C./0.05 Torr to obtain a product in a colorless oil state (23.19 g, 69.3%).

1H NMR (400 MHz, CDCl3), δ 0.33 (s, 12H), 0.75 (s, 4H), 2.93 (s, 6H).

13C NMR (100 MHz, CDCl3), δ −1.83 (s), 7.45 (s), 40.08 (s).

29Si NMR (80 MHz, CDCl3), δ 32.39 (s)

Preparation Example 2: Synthesis of Compound 1-2

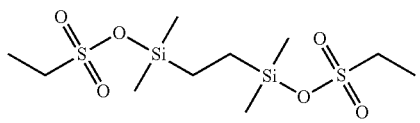

[Compound 1-2]

A mixture of 1,2-bis(chlorodimethylsilyl)ethane (15.07 g, 0.07 mol) and ethanesulfonic acid (15.42 g, 0.14 mol) was heated up to 140° C. for one hour and then, stirred for about 4 hours, while the temperature was maintained. The reactant was cooled down to ambient temperature and then, distilled under vacuum by using a Vigreux column. The resultant was treated through fractional distillation under 171 to 174° C./0.05 Torr to obtain a product in a colorless oil state (11.52 g, 45.4%).

1H NMR (400 MHz, CDCl3), δ 0.34 (s, 12H), 0.77 (s, 4H), 1.33 (t, 6H), 3.03 (q, 4H).

13C NMR (100 MHz, CDCl3), δ −1.77 (s), 7.56 (s), 8.60 (s), 46.96 (s).

29Si NMR (80 MHz, CDCl3), δ 32.24 (s).

Preparation Example 3: Synthesis of Compound 1-3

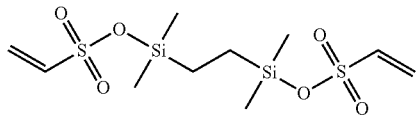

[Compound 1-3]

Trimethylsilylsulfonyl chloride (38.47 g, 0.204 mol) was added in a dropwise fashion to 1,4-divinyl-1,1,4,4,-tetramethyl-1,4-disilabutane (19.94 g, 0.101 mol) in a reaction flask in an ice bath for 2 hours under a cooling condition. Subsequently, the reaction mixture was maintained at a temperature of 20° C. for 15 hours. The reaction mixture was heated up to 110° C. and then, distilled, while simultaneously maintained at the corresponding temperature for 5 hours to remove trimethylsilyl chloride produced as a byproduct. After being cooled down to ambient temperature, the remaining reaction mixture was distilled under vacuum by using a short Vigreux column.

The resultant was redistilled under a condition of a fractionation temperature of 184 to 188° C./0.05 Torr to obtain a product in an oil state wherein crystals were observed (21.78 g, 60.4%). The corresponding material was very sensitive to moisture.

1H NMR (400 MHz, CDCl3), δ 0.40 (s, 12H), 0.82 (s, 4H), 5.97 (d, 2H), 6.32 (d, 2H), 6.62 (dd, 2H).

13C NMR (100 MHz, CDCl3), δ −1.74 (s), 7.59 (s), 127.23 (s), 135.24 (s).

29Si NMR (80 MHz, CDCl3), δ 33.62 (s).

Example 1

A positive active material slurry was prepared by mixing $LiNi_{0.8}Co_{0.15}Al_{0.05}O_2$ as a positive active material, polyvinylidene fluoride as a binder, and ketjen black as a conductive material in a weight ratio of 97.3:1.4:1.3 and dispersing the mixture in N-methyl pyrrolidone.

The positive active material slurry was coated on a 15 μm-thick Al foil, dried at 100° C., and pressed to manufacture a positive electrode.

A negative active material slurry was prepared by mixing graphite as a negative active material, polyvinylidene fluoride as a binder, and ketjen black as a conductive material in a weight ratio of 98:1:1 and then, dispersing the mixture in N-methyl pyrrolidone.

The negative active material slurry was coated on a 10 μm-thick Cu foil, dried at 100° C., and pressed to manufacture a negative electrode.

The positive and negative electrodes, a 25 μm-thick polyethylene separator, and an electrolyte were used to manufacture a rechargeable lithium battery cell.

The electrolyte had a following composition.

(Electrolyte Composition)
Salt: 1.5 M $LiPF_6$
Solvent: ethylene carbonate:ethylmethyl carbonate:dimethyl carbonate:fluoroethylene carbonate (EC:EMC:DMC:FEC=a volume ratio of 15:10:59:16)
Additive: Compound 1-10.2 wt %
(Herein, in the electrolyte composition, "wt %" is based on a total weight of the electrolyte (a lithium salt+non-aqueous organic solvent+additive))

Example 2

A rechargeable lithium battery cell was manufactured according to the same method as Example 1 except that the electrolyte composition was changed as follows.
(Electrolyte Composition)
Salt: 1.5 M $LiPF_6$
Solvent: ethylene carbonate:ethylmethyl carbonate:dimethyl carbonate (EC:EMC:DMC=a volume ratio of 2:2:6)
Additive: Compound 1-10.25 wt %

Example 3

A rechargeable lithium battery cell was manufactured according to the same method as Example 2 except that the amount of the additive was changed to 0.5 wt %.

Example 4

A rechargeable lithium battery cell was manufactured according to the same method as Example 2 except that 1 wt % of Compound 1-2 of Preparation Example 2 was used.

Example 5

A rechargeable lithium battery cell was manufactured according to the same method as Example 2 except that 1 wt % of Compound 1-3 of Preparation Example 3 was used.

Comparative Example 1

A rechargeable lithium battery cell was manufactured according to the same method as Example 1 except that the additive was not added.

Comparative Example 2

A rechargeable lithium battery cell was manufactured according to the same method as Example 2 except that the additive was not added.

Battery Characteristics Evaluation

Evaluation 1: Evaluation of Storage Characteristics at High Temperature

Each rechargeable lithium battery cell according to Examples 1 to 5 and Comparative Examples 1 and 2 was charged up to a voltage of SOC 100% (state of charge) by constant current-charging at a current of a 0.5 C rate up to a voltage of 4.2 V (vs. Li) at 25° C. and subsequently, cutting off in a constant voltage mode at a current of a 0.05 C rate, while 4.2 V was maintained.

Direct current internal resistance (DC-IR) of the charged rechargeable lithium battery cell and direct current internal resistance (DC-IR) thereof after being stored in a 60° C. oven for 20 days were measured in the following method. These direct current internal resistances (DC-IR) are respectively called to be initial DC resistance and DC resistance after stored at a high temperature.

The cells were constant current discharged at 0.5 C for 30 seconds, paused for 30 seconds, then, constant current charged at 0.5 C for 30 seconds, paused for 10 minutes, constant current discharged at 1.0 C for 30 seconds, paused for 30 seconds, constant current charged at 0.5 C for 1 minute, paused for 10 minutes, constant current discharged at 2.0 C for 30 seconds, paused for 30 seconds, constant current charged at 0.5 C for 2 minutes, paused for 10 minutes, constant current discharged at 3.0 C for 30 seconds, paused for 30 seconds, constant current charged at 0.5 C for 3 minutes, and paused for 10 minutes.

An average voltage drop at each C-rate for 30 seconds was obtained as DC resistance ($\Delta V/\Delta I = R$).

The measured initial DC resistance and DC resistance after stored at a high temperature are shown in Tables 1 and 2.

TABLE 1

|  | Initial DC resistance (mOhm) | DC resistance after high temperature storage for 20 days (mOhm) |
|---|---|---|
| Comparative Example 1 | 20.3 | 25.9 |
| Example 1 | 19.9 | 24.9 |

TABLE 2

|  | Initial DC resistance (mOhm) | DC resistance after high temperature storage for 20 days (mOhm) |
|---|---|---|
| Comparative Example 2 | 19.5 | 30.7 |
| Example 2 | 19.0 | 28.9 |
| Example 3 | 18.8 | 28.4 |
| Example 4 | 18.9 | 27.4 |
| Example 5 | 19.0 | 27.1 |

Referring to Tables 1 and 2, Example 1 (using an additive represented by Chemical Formula 1) showed low DC resistance after being stored at a high temperature (60° C.) as well as low initial DC resistance compared with Comparative Example 1. In addition, Examples 2 to 5 (also using additives represented by Chemical Formula 1) showed low DC resistance after stored at a high temperature (60° C.) as well as low initial DC resistance compared with Comparative Example 2.

Accordingly, when the compound represented by Chemical Formula 1 was used as an additive, high temperature antiresistance or conductivity of the battery cells in a charge state turned out to be improved.

Evaluation 2: Evaluation of High Temperature Safety

High temperature safety of the rechargeable lithium battery cells according to Example 1 and Comparative Example 1 was evaluated by measuring their CID (Current Interrupt Device) operation-starting points, and the results are shown in Table 3.

First, after twice performing a formation charge/discharge at 0.2 C/0.5 C and respectively once performing a charge/discharge experiment at standard charge/discharge current density of 0.5 C/0.2 C, a charge cut-off voltage of 4.2 V (Li/graphite), and a discharge cut-off voltage of 2.6 V (Li/graphite), the cells were placed in a 90° C. chamber for 60 hours, and CID (Current Interrupt Device) operation-starting points thereof were measured.

TABLE 3

|  | CID OPEN TIME (hr) (@90° C.) |
|---|---|
| Comparative Example 1 | 20.4 |
| Example 1 | 21.3 |

Referring to Table 3, Example 1 (including the compound represented by Chemical Formula 1 as an additive) showed a delayed CID open time compared with Comparative Example 1. For example, a rechargeable lithium battery cell according to Example 1 showed an excellent effect of suppressing gas generation when placed at a high temperature.

Evaluation 3: Evaluation of Cycle-Life Characteristics

Figure 2:
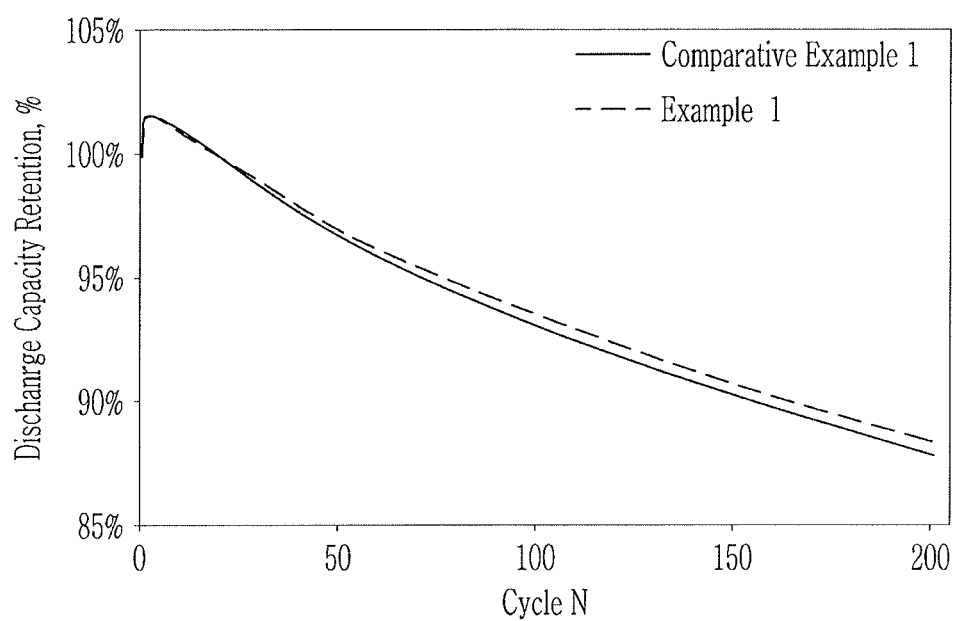
FIG. 2 illustrates a graph showing discharge capacity retention at 25° C. according to the cycles of the rechargeable lithium battery cells.

The rechargeable lithium battery cells according to Example 1 and Comparative Example 1 were charged under a condition of 4 A and 4.2 V CC-CV and 100 mA cut-off for 10 minutes at a temperature of 25° C. and discharged under a condition of 10 A CC and 2.5 V cut-off for 30 minutes as one cycle, and then, capacity retentions thereof after 200 cycles were shown in FIG. 2.

Figure 3:
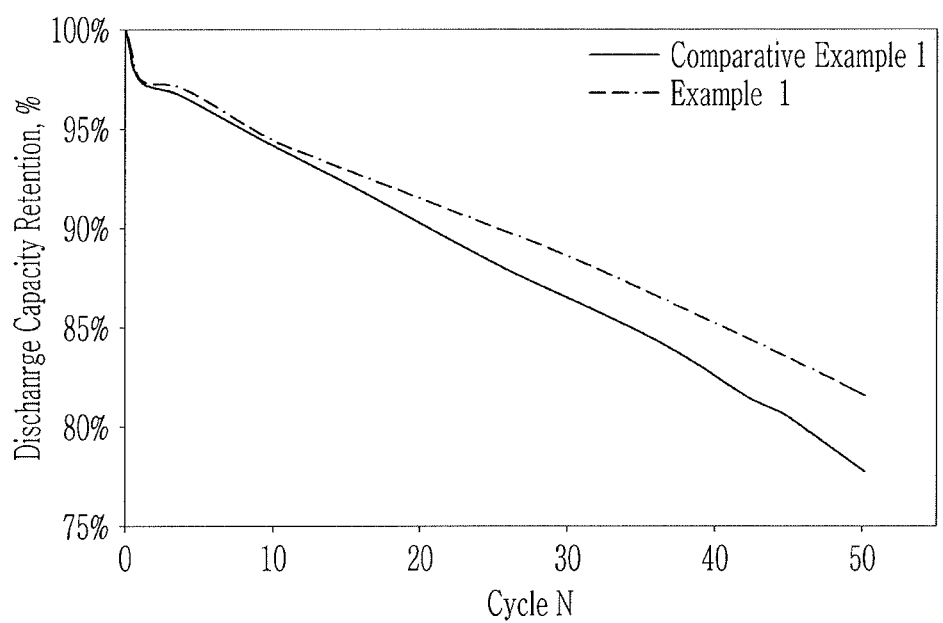
FIG. 3 illustrates a graph showing discharge capacity retention at 0° C. according to the cycles of the rechargeable lithium battery cells.

In addition, the rechargeable lithium battery cells according to Example 1 and Comparative Example 1 were charged under a condition of 4 A and 4.2 V CC-CV and 500 mA cut-off for 10 minutes at a temperature of 0° C. and discharged under a condition of 15 A CC and 1.5 V cut-off for 30 minutes as 1 cycle, and capacity retentions thereof after 50 cycles were evaluated and shown in FIG. 3.

FIG. 2 is a graph showing discharge capacity retention at 25° C. according to the cycles of the rechargeable lithium battery cells.

FIG. 3 is a graph showing discharge capacity retention at 0° C. according to the cycles of the rechargeable lithium battery cells.

Referring to FIG. 2, Example 1 showed excellent 25° C. charge and discharge cycle characteristics compared with Comparative Example 1.

In addition, referring to FIG. 3, Example 1 showed excellent 0° C. charge and discharge cycle characteristics compared with Comparative Example 1.

From these results, the rechargeable lithium battery including the compound represented by Chemical Formula 1 as an additive exhibited excellent cycle-life characteristics.

By way of summation and review, an electrolyte may include an organic solvent in which a lithium salt is dissolved and may determine stability and performance of a rechargeable lithium battery.

$LiPF_6$ (which may be used as a lithium salt of an electrolyte) may react with a solvent of electrolyte to promote depletion of a solvent and generate a large amount of gas. When $LiPF_6$ is decomposed, it generates LiF and $PF_5$, which leads to electrolyte depletion in the battery, resulting in degradation in high temperature performance and poor safety.

One or more embodiments may provide an electrolyte that may help suppress side reactions of a lithium salt and may help improve the performance of the battery.

One or more embodiments may provide an electrolyte for a rechargeable lithium battery capable of improving high temperature stability and cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a rechargeable lithium battery, the electrolyte comprising:
   a non-aqueous organic solvent;
   a lithium salt; and
   an additive,
   wherein the additive includes a compound represented by Chemical Formula 1:

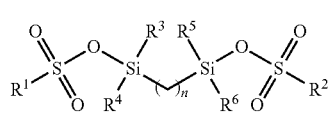

[Chemical Formula 1]

wherein, in Chemical Formula 1,
$R^1$ to $R^6$ are each independently hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and
n is an integer of 1 to 10.

2. The electrolyte as claimed in claim 1, wherein the compound represented by Chemical Formula 1 is represented by Chemical Formula 1A:

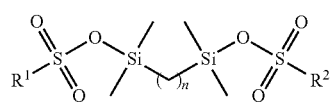

[Chemical Formula 1A]

wherein, in Chemical Formula 1A,
$R^1$ and $R^2$ are each independently hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and
n is an integer of 1 to 10.

3. The electrolyte as claimed in claim 2, wherein $R^1$ and $R^2$ are each independently a substituted or unsubstituted C1 to C4 alkyl group or a substituted or unsubstituted C2 to C4 alkenyl group.

4. The electrolyte as claimed in claim 2, wherein $R^1$ and $R^2$ are each independently an unsubstituted C1 to C4 alkyl group, a C1 to C4 alkyl group that is substituted or with a halogen or a cyano group, an unsubstituted C2 to C4 alkenyl group, or a C2 to C4 alkenyl group that is substituted with a halogen or a cyano group.

5. The electrolyte as claimed in claim 1, wherein:
   $R^1$ and $R^2$ are each independently a methyl group, an ethyl group, or a vinyl group, and
   $R^3$ to $R^6$ are each independently a substituted or unsubstituted C1 to C5 alkyl group.

6. The electrolyte as claimed in claim 1, wherein the compound represented by Chemical Formula 1 is included in the electrolyte in an amount of 0.05 wt % to 2 wt %, based on a total weight of the electrolyte for a rechargeable lithium battery.

7. The electrolyte as claimed in claim 1, wherein the compound represented by Chemical Formula 1 is included in the electrolyte in an amount of 0.2 wt % to 1 wt %, based on a total weight of the electrolyte for a rechargeable lithium battery.

8. The electrolyte as claimed in claim 1, wherein the additive consists of the compound represented by Chemical Formula 1.

9. A rechargeable lithium battery, comprising:
   a positive electrode;
   a negative electrode; and
   an electrolyte as claimed in claim 1.

10. The rechargeable lithium battery as claimed in claim 9, wherein the compound represented by Chemical Formula 1 is represented by Chemical Formula 1A:

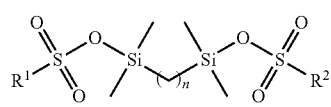

[Chemical Formula 1A]

wherein, in Chemical Formula 1A,
$R^1$ and $R^2$ are each independently hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and n is an integer of 1 to 10.

11. The rechargeable lithium battery as claimed in claim 10, wherein $R^1$ and $R^2$ are each independently a substituted or unsubstituted C1 to C4 alkyl group or a substituted or unsubstituted C2 to C4 alkenyl group.

12. The rechargeable lithium battery as claimed in claim 10, wherein $R^1$ and $R^2$ are each independently an unsubstituted C1 to C4 alkyl group, a C1 to C4 alkyl group that is substituted or with a halogen or a cyano group, an unsubstituted C2 to C4 alkenyl group, or a C2 to C4 alkenyl group that is substituted with a halogen or a cyano group.

13. The rechargeable lithium battery as claimed in claim 9, wherein:
$R^1$ and $R^2$ are each independently a methyl group, an ethyl group, or a vinyl group, and
$R^3$ to $R^6$ are each independently a substituted or unsubstituted C1 to C5 alkyl group.

14. The rechargeable lithium battery as claimed in claim 9, wherein the compound represented by Chemical Formula 1 is included in the electrolyte in an amount of 0.05 wt % to 2 wt %, based on a total weight of the electrolyte for a rechargeable lithium battery.

15. The rechargeable lithium battery as claimed in claim 9, wherein the compound represented by Chemical Formula 1 is included in the electrolyte in an amount of 0.2 wt % to 1 wt % based on a total weight of the electrolyte for a rechargeable lithium battery.

16. The rechargeable lithium battery as claimed in claim 9, wherein the additive consists of the compound represented by Chemical Formula 1.

17. The electrolyte as claimed in claim 1, wherein:
the compound represented by Chemical Formula 1 is one of the following Compounds 1-1 to 1-3,

[Compound 1-1]

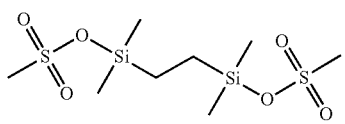

[Compound 1-2]

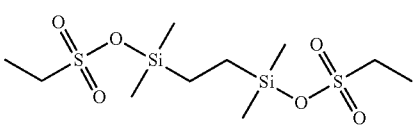

[Compound 1-3]

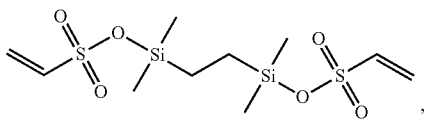

and

Compound 1-1, Compound 1-2, or Compound 1-3 is included in the electrolyte in an amount of 0.2 wt % to 1 wt % based on a total weight of the electrolyte for a rechargeable lithium battery.

18. The rechargeable lithium battery as claimed in claim 9, wherein:
the compound represented by Chemical Formula 1 is one of the following Compounds 1-1 to 1-3,

[Compound 1-1]

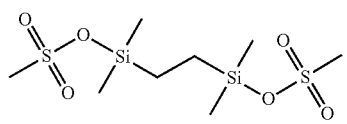

[Compound 1-2]

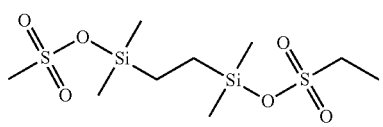

[Compound 1-3]

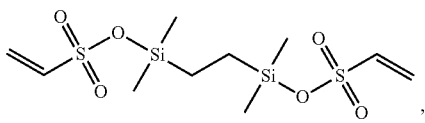

and

Compound 1-1, Compound 1-2, or Compound 1-3 is included in the electrolyte in an amount of 0.2 wt % to 1 wt % based on a total weight of the electrolyte for a rechargeable lithium battery.

* * * * *